United States Patent [19]

Hetrick

[11] Patent Number: 5,172,144

[45] Date of Patent: Dec. 15, 1992

[54] IMAGE DISPLAY CONTROL PANEL FOR OVERHEAD PROJECTORS

[76] Inventor: Keith G. Hetrick, 5444 E. Pinchot, Phoenix, Ariz. 85018

[21] Appl. No.: 845,634

[22] Filed: Mar. 4, 1992

[51] Int. Cl.⁵ .............................................. G03B 21/14
[52] U.S. Cl. ................................. 353/97; 353/DIG. 6
[58] Field of Search ..................... 353/DIG. 6, 97, 88, 353/122, 119, DIG. 5, DIG. 3

[56] References Cited

U.S. PATENT DOCUMENTS 4,523,823  6/1985  Roope .................................. 353/97

Primary Examiner—William A. Cuchlinski, Jr.
Assistant Examiner—William C. Dowling
Attorney, Agent, or Firm—Joseph H. Roediger

[57] ABSTRACT

An attachment device for overhead projectors which permits blocking of the image display by changing the position of an opaque panel wherein the device is frictionally attached to the projection head. The opaque panel of heat transmitting foil is hingedly attached to a hood. The sides of the hood extend downwardly and are biased inwardly to engage the projection head.

9 Claims, 1 Drawing Sheet

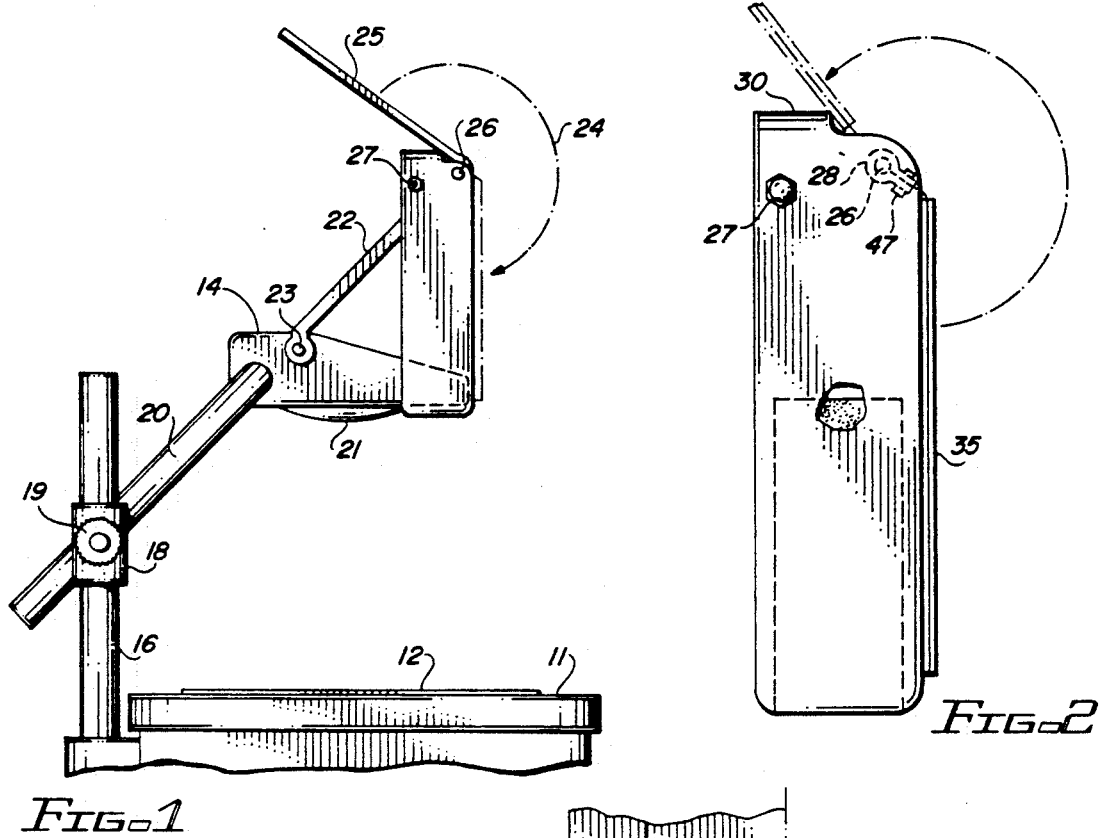
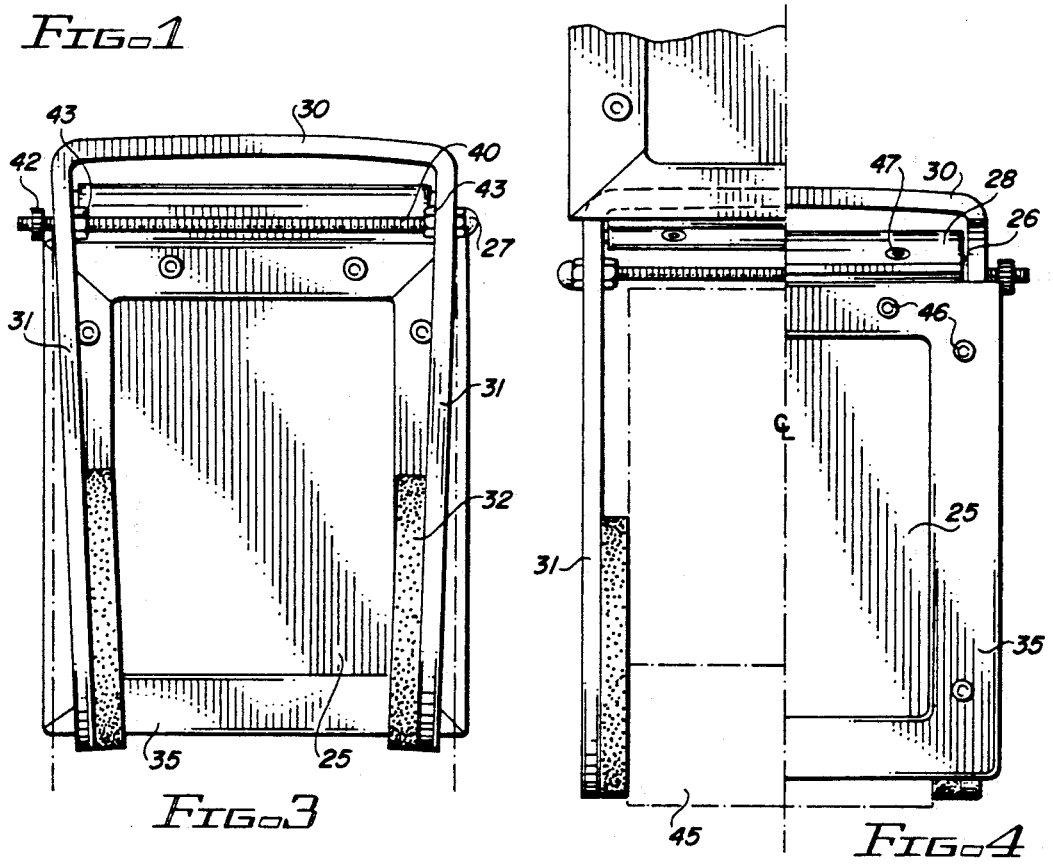

IMAGE DISPLAY CONTROL PANEL FOR OVERHEAD PROJECTORS

BACKGROUND

This invention relates to a removable attachment for overhead projectors which permits the operator of the projector to readily control the image display. More particularly, the invention is directed to an attachment for overhead projectors which is transportable for use on different projection heads.

In audiovisual presentations it has become commonplace to use an overhead projector wherein transparencies are placed on a light box contained in the projector base. The images on the transparencies are projected upwardly from the base and reflected by an elevated projection head onto a display surface. The projection head typically includes the combination of a condensing lens and mirror. In general, the displayed images are in aid of an oral presentation and are continually changed to illustrate and emphasize certain points being made by the speaker during the presentation. Normally, the presentation is interrupted to receive comments from the audience. In order to then concentrate attention on the speaker, either the transparency is removed or the overhead projector is switched off. When the lecturer leaves the light on, the removal and replacement of transparencies distracts the audience from the lecturer. Turning the projector off manually interferes with the presentation of the speaker, especially if he is the operator of the projector since the continuity of presentation and continuous eye contact are interrupted. In addition, the frequent use of the on/off switch subjects the light sources to repeated thermal stress and shortens the lifetime thereof.

These problems can be dealt with by furnishing a relatively simple handoperable device which interrupts the projection of the image. One approach to this type of device is set forth in U.S. Pat. No. 4,523,823 wherein a flip panel of opaque material is secured to the front edge of the projection head by a hook and eye fabric fastener such as the flexible fastener sold under the mark VELCRO. The prior art device is constructed so that the panel has two positions, one of which is a blocking position wherein it hangs down over the face of the projection head and the other is a rearwardly projecting position which removes it from the light path. In order to utilize this device, a portion of the fastener has to be adhered to the top of the projection head. This is not always practical since the topmost element of the head is likely to be merely a planar reflecting surface of limited thickness. Furthermore, the device is not usable with different heads since the fastener is not removably secured to the projection head. In addition, the plastic panel when it is in its light blocking position continually receives incident energy thereby raising its temperature over a period of time. The heat generated thereby can cause the panel to deform and impair its usefulness.

Accordingly, the present invention is directed to an attachment device which can be readily removed from a projection head and transported to another site for use with another projection head. In addition, this invention incorporates a blocking panel that is capable of withstanding high temperatures which is important in situations wherein the panel is in a blocking position for an extended period. Furthermore, the subject invention is constructed in a manner which enables the device to be firmly secured to a variety of different size and style projection heads.

SUMMARY OF THE INVENTION

The invention relates to a device for attachment to overhead projectors of the type utilizing an elevated projector head positioned over the light source and image former. In operation, the projection head receives the image, normally condenses it, and reflects it at a right angle to a display surface located on a nearby wall. The invention includes a flexible attachment bracket having a generally inverted U-shape which includes a horizontal crosspiece having opposing ends. A side section depends from each of those ends. Each side section extends downwardly and terminates in a free end. The free ends of the side sections are laterally movable to receive the projection head therebetween.

An opaque panel mounted in a frame is attached by a hinge to the bracket. The panel is dimensioned to cover the path of the image projected from the head with the hinge means located on the attachment bracket. The crosspiece of the bracket is arcuate and curved downwardly at its opposing ends. In addition, the free ends of the side sections are disposed inwardly toward each other. An adjustable clamping means is affixed to the bracket for adjusting the relative position of the side sections and the clamping force exerted thereby. By varying the force on the crosspiece, the arc of the crosspiece can be increased and the free ends of the side sections are urged inwardly. This enables the device to be installed on projection heads of different widths.

The opaque panel is provided with a peripheral frame and includes a central region formed of metallic foil. During periods when the panel is in a light blocking position, the incident energy is found not to disturb the planarity of the metallic foil. As a result, damage to the panel resulting from increased temperature is essentially eliminated.

Further features and advantages of the invention will become more readily apparent from the following detailed description of a preferred embodiment when taken in conjunction with accompanying drawings.

DESCRIPTION OF THE DRAWINGS

FIG. 1 is a side view of one embodiment of the present invention installed on a projection head.

FIG. 2 is an expanded side view of the embodiment of FIG. 1.

FIG. 3 is a rear view of the embodiment of FIG. 1 with the panel in a blocking position.

FIG. 4 is a front view of the embodiment of FIG. 1 split to show the hinge in different panel positions.

DESCRIPTION OF THE PREFERRED EMBODIMENT

Referring now to FIG. 1, the appropriate portions of an overhead projector are shown comprising a light table 11 having a planar surface 12 for receiving transparencies thereon. A light source is located within the light table beneath the transparency receiving surface 12. When the light source is on, the image from the transparency is projected upwardly to the projection head 14.

The projection head is supported in overlying relation to the light table 11. Vertical rod 16 having a sleeve 18 movably located thereon is attached to a corner of table 11. The vertical position of sleeve 18 on rod 16 can be adjusted by use of the fastening knob 19. The support arm 20 is angularly attached to sleeve 18 and supports the projection head in position overlying the central portion of planar surface 12. The projection head includes a condensing lens 21 and a movable reflecting surface 22 which is pivotally mounted and secured thereto by pins 23. After passing through the condensing lens 21, the image is reflected by surface 22 to the display surface located in front of the audience. The angles of incidence and reflection can be readily adjusted by changing the position of surface 22.

The attachment bracket 24 is shown in position on the projection head 14 with the opaque panel 25 and frame rotated rearwardly to the position for image display. The frame and the opaque panel is hinged to the bracket 24 for rotation about rod 26. The light blocking position is attained by rotation of the panel 25 in the direction of the arrow shown in dashed outline in FIG. 1. The bracket with the panel in the light blocking position is shown in the side view of FIG. 2. As seen therein, the hinge mechanism in the preferred embodiment is formed by a single piece of flexible material which is looped about the rod 26. The free end of the material in hinge 28 are affixed to the frame of the opaque panel 25. This detail is shown by the dashed lines in FIG. 2 showing the panel in its open position resting against crosspiece 30 of the attachment bracket.

The crosspiece 30 has opposing side sections 31 depending downwardly from its ends as shown in FIG. 3. Each of the side sections 31 has a portion of its inner surface covered with a deformable pad 32. The outline of the pad is shown by the dashed line in FIG. 2 with a cutout in the side section showing the upper limit thereof. As will be later discussed, the pads 32 on the sections 31 frictionally engage adjacent portions of the projection head when the device is installed. The side sections 31 are inwardly disposed toward each other so that the spacing between the free ends is less than the spacing where the sections join the crosspiece. The bracket 24 is formed as a single piece of a flexible resilient plastic material with the free ends angled inwardly as shown in FIG. 3.

In the preferred embodiment, the crosspiece 30 is formed as an arcuate member rather than a flat connection piece between the side sections 31. As a result, crosspiece 30 is curved downwardly at its opposing ends and appears bowed when viewed prior to installation. The arcuate contour of the crosspiece assists in the establishment of the initial position of the free ends and bias them inwardly. When the device is installed, the side sections 31 can be moved outwardly away from each other without causing the crosspiece to bow inwardly. To limit the forces on the crosspiece 30 resulting from lateral outward movement of the side sections 31, a threaded adjustable limiting member 40 is provided.

The limiting member 40 also serves as an adjustable clamping means when the bracket is in place on a projection head. Positioning nuts are threaded on member 40 during assembly to permit the side sections 31 to receive member 40 and then are moved outwardly to control the initial spacing between the side sections. An end cap 27 is threaded onto one end of member 40. The opposing end receives a knurled nut 42 which in combination with the adjacent nut 43 enables the relative position of the side sections 31 to be changed. The endcap 27 and nut 42 serve as limit means to prevent unlimited outward urging of the side sections from damaging the corner joints with crosspiece 30. In addition, the inward adjustment of the nut 42 serves to increase the tension on crosspiece 30 and produce an increase in the curvature thereof. By this adjustment, the side sections 31 and the pads 32 adhered to the inside surfaces thereof are moved inwardly and are securely clamped to adjacent portions of the projection head.

In the rear view of the invention seen in FIG. 3, the opaque panel 25 is shown in the blocking position wherein it is located in the path of the image reflected by the projection head. Since the device as shown is not installed, the side sections 31 are angled inwardly toward each other. In FIG. 4, the device is positioned on a projection head 45. The projection head is shown in dashed outline as a rectangular piece corresponding to an end view of the representative projection head shown in FIG. 1. Different makes and models of overhead projectors have different projection head dimensions and may require the use of replacement pads 32 of different dimensions in order to accommodate the projection head between side sections. As seen in FIG. 4, the opaque panel 25 is supported in a frame 35. The frame is preferably formed of two identical halves with the panel 25 held therein by fasteners 46 located around the frame. The panel 25 is advantageously formed of opaque metallic foil which is heat resistant in that it does not deform at high temperatures. One type of metallic foil found to be well-suited for use in the present invention is sold under the trademark CINE FOIL by the Rosco Company of Los Angeles, Calif.

The panel and frame are hingedly mounted on rod 26 which extends between the upper regions of side sections 31 proximate to the crosspiece 30. The hinge includes a flexible plastic material having one end secured in the frame 35 and the opposing end secured to a loop of heavier guage plastic material. The loop extends about the rod 26. The heavier guage material is fastened to itself by rivets 47 to provide the hinge as shown in FIG. 4. Spacing can be provided between the mating frame halves to receive the hinge material by providing a section of reduced thickness in the top of the frame.

When the invention is attached to the projection head, the side sections 31 are urged apart, the device is positioned thereon and then the sections released so that the pads 32 contact the adjacent portions of the head. Next, the tension on the crosspiece is adjusted by rotation of the knurled nut 42 to control the gripping action of the pads. During the presentation, the panel can be moved between the positions shown in the split view of FIG. 4 whenever the presenter wishes to block the image displayed. In the projection position, the frame 35 rests against the crosspiece. The width of the crosspiece 30 is less than that of side sections 31 as shown in FIG. 2 thereby enabling the frame 35 to rotate over center and rest against the crosspiece.

While the foregoing description has referred to a specific embodiment of the invention, it is to be recognized that variations and modifications may be made therein without departing from the scope of the invention.

I claim:

1. A device for attachment to overhead projectors of the type having an elevated projection head for projecting an image to a display surface, said device comprising:

a) a flexible attachment bracket having a cross piece with opposing ends and a side section depending from each end of said crosspiece, each side section having a free end, said free ends being laterally moveable to receive a projection head therebetween;

b) an opaque panel hingedly attached to said bracket and dimensioned to cover the path of the projected image; and c) means for hingedly attaching the opaque panel to the attachment bracket, said panel having a first position in the path of the projected image and a second position removed from said path.

2. The invention in accordance with claim 1 further comprising means affixed to said bracket for adjusting the relative position of the side sections.

3. The invention in accordance with claim 2 wherein said crosspiece is arcuate and curved downwardly at said opposing ends, and said means for adjusting the relative position of the side sections comprising tensioning means for varying the arc of the crosspiece.

4. The invention in accordance with claim 1 wherein the free ends of said side sections are disposed inwardly toward each other.

5. The invention in accordance with claim 4 further comprising means affixed to said bracket for adjusting the relative position of the side sections.

6. The invention in accordance with claim 5 wherein said opaque panel includes a frame and central region, said central region intercepting the projected image.

7. The invention in accordance with claim 6 wherein the central region of said panel is formed of a metallic foil.

8. The invention in accordance with claim 7 further comprising engaging means affixed to said side sections for frictionally engaging adjacent portions of the projection head.

9. The invention in accordance with claim 8 wherein said crosspiece is narrow to permit the side sections to extend forwardly thereof, said side sections receiving said means for hingedly attaching the opaque panel.

* * * * *